United States Patent [19]

Luciani et al.

[11] Patent Number: 4,854,033

[45] Date of Patent: Aug. 8, 1989

[54] INSERTING INSULATING MATERIAL INTO ELECTRIC MOTOR STATORS

[75] Inventors: Sabatino Luciani; Luciano Santandrea, both of Florence, Italy

[73] Assignee: AXIS USA Inc., Peabody, Mass.

[21] Appl. No.: 306,673

[22] Filed: Feb. 6, 1989

Related U.S. Application Data

[63] Continuation of Ser. No. 212,266, Jun. 27, 1988, Pat. No. 4,831,716.

[51] Int. Cl.⁴ ............................................. H02K 15/10
[52] U.S. Cl. ................................... 29/596; 29/564.6; 29/734; 493/356; 493/949
[58] Field of Search ................. 29/596, 564.1, 564.2, 29/564.6, 564.8, 564.7, 734, 736; 493/344, 360, 949, 356

[56] References Cited

U.S. PATENT DOCUMENTS

| | | | |
|---|---|---|---|
| 3,616,512 | 11/1971 | Appenzeller et al. | 29/205 E |
| 3,634,932 | 1/1972 | Mason | 29/596 |
| 3,702,498 | 11/1972 | Mason | 29/596 |
| 3,703,854 | 11/1972 | Schlaudroff | 493/344 |
| 3,778,890 | 12/1973 | Schlaudroff | 29/596 |
| 3,802,067 | 4/1974 | Davis | 29/596 |
| 3,831,255 | 8/1974 | Smith et al. | 29/205 E |
| 3,926,421 | 12/1975 | Reiger et al. | 269/57 |
| 4,136,433 | 1/1979 | Copeland et al. | 29/564.6 |
| 4,186,478 | 2/1980 | Hamane et al. | 29/596 |
| 4,433,466 | 2/1984 | Koenig | 29/564.6 |
| 4,495,692 | 1/1985 | Walker | 29/564.1 |

FOREIGN PATENT DOCUMENTS

| | | | |
|---|---|---|---|
| 51858 | 5/1982 | European Pat. Off. | 29/734 |
| 80248 | 5/1982 | Japan | 29/734 |
| 658670 | 4/1979 | U.S.S.R. | 29/734 |
| 871281 | 10/1981 | U.S.S.R. | 29/564.6 |

OTHER PUBLICATIONS

"UCI-300/302 Universal Stator Cell Inserter," Axis S.p.A., 50028 Tavarnelle Val di Pesa (Firenze) Italy (English only).
"UCI-300/302 Universal Stator Cell Inserter," Axis S.p.A., 50028 Tavarnelle Val di Pesa (Firenze), Italy (four languages).
"Isolatrice di Statori UCI-400/402," Axis S.p.A. (Italian and German).

Primary Examiner—William Briggs
Attorney, Agent, or Firm—Eric C. Woglom; Robert R. Jackson

[57] ABSTRACT

A machine for forming electric motor stator insulating material and inserting it vertically directly into the stator placed on the pallet of a transportation system, without removing the stator from its pellet. The machine includes a guiding system for the paper fed from a feed roll, with the following elements working in sequence: a pair of rollers for trimming the paper to the required width; a pair of paper shaping and pulling rollers, at least one of which is motor-operated and the other of which can be moved away from the first one during insertion of the paper into the machine; a paper cutter operating in a substantially horizontal direction for cutting across the paper; a former for forming the cut paper inside vertical guides and operating parallel to the cutter; and an inserter for inserting the cut and bent paper into the stator slot and operating in a vertical direction moving through the paper former.

16 Claims, 3 Drawing Sheets

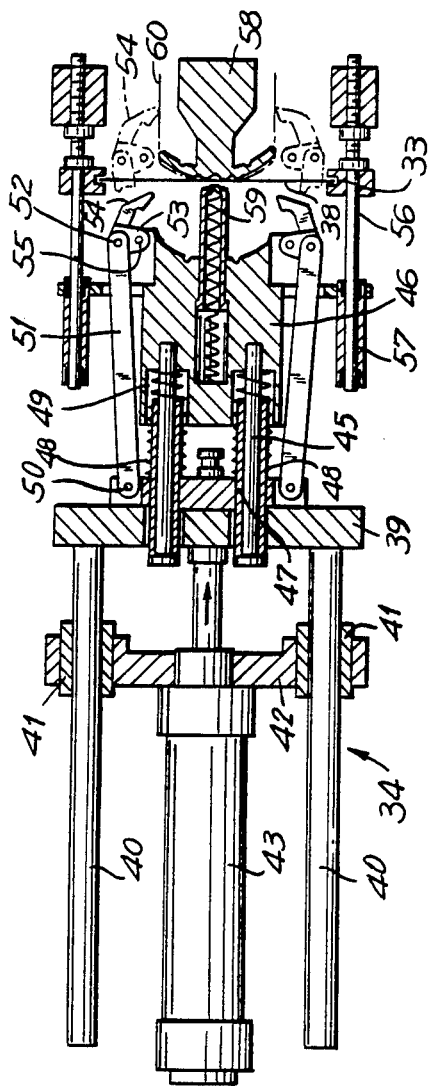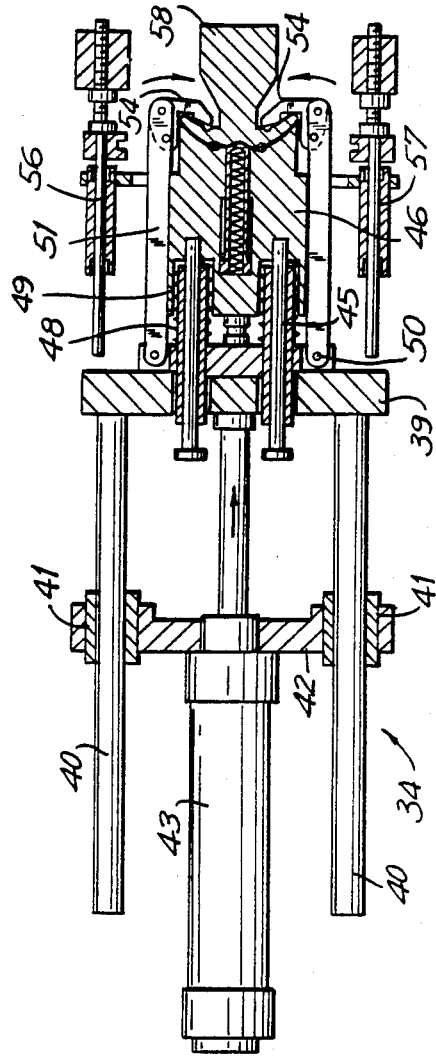

INSERTING INSULATING MATERIAL INTO ELECTRIC MOTOR STATORS

This is a continuation of application Ser. No. 212,266 filed June 27, 1988 U.S. Pat. No. 4,831,716.

BACKGROUND OF THE INVENTION

This invention relates to a machine for shaping stator insulating paper and for vertically inserting the paper into the stator directly on the stator assembly line. In automated production lines the machines are generally served by an accumulating transportation system in order to obtain maximum efficiency. To do this, the machines are designed in the simplest possible way. Therefore, where possible, the machinings are performed directly on the transportation system.

The existing machines for shaping the insulating paper for stators consist of elements for the following process, in sequence:

forming the paper by passing it through properly shaped rolling dies;

cutting and shaping the paper, fed horizontally and with the cutting operation being in the vertical plane; and after cutting, shaping the paper with two operators on a vertical plane, parallel to the cutting plane.

An object of this invention is to provide a machine of the above-mentioned type, wherein, although some of the elements of existing machines are employed, the arrangement of the elements is more rational in relation to the transportation system, so that a system for transporting the paper from the shaping device to the object to be insulated (the stator) and a system for taking the stator from the transportation system to the shaping machine are not required.

Each operating element of the machine is also improved as regards functionality and ergonomic arrangement of the space, thus increasing the reliability and reducing the overall dimensions of the machine.

SUMMARY OF THE INVENTION

These and other objects of the invention are accomplished in accordance with the principles of the invention by providing a machine for forming the insulating paper for stators with vertical insertion directly on the transportation system, wherein the paper is fed from a feeding coil placed upstream of the machine, and with the following features in the sequence hereunder described:

a pair of rollers for trimming the paper to the required transverse dimension;

a pair of paper shaping and pulling rollers, at least one of which is motor-operated and the other of which can be moved away from the first one during insertion of the paper into the machine;

means for cutting the paper which operates in a substantially horizontal direction;

means for forming the cut paper inside vertical guides, operating parallel to the cutting means; and means for inserting the cut and bent paper into the stator slots, operating in a vertical direction and moving through the paper forming means.

Further features of the invention, its nature and various advantages will be more apparent from the accompanying drawings and the following detailed description of the preferred embodiments.

BRIEF DESCRIPTION OF THE DRAWINGS

FIGS. 5, 6, and 7 are enlarged views taken along the line V—V in FIG. 2 showing three different stages in the operating cycle of the machine.

DETAILED DESCRIPTION OF THE PREFERRED EMBODIMENTS

Figure 2:
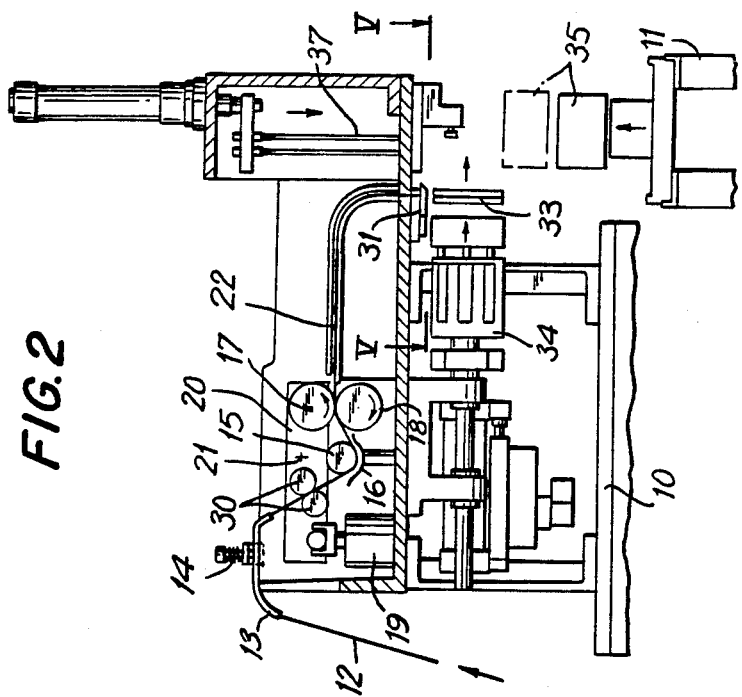
FIGS. 1 and 2 are respectively elevational views (partly in section) of the two sides of the machine.

The machine is fitted to a base plate 10 which supports it and enables it to work at the height of the transfer plane of the workpiece to be processed coming from the conveyor 11.

The strip of insulating material 12 is drawn from a feeding roll (not illustrated) and is initially manually inserted onto a shaped chute 13 where it is braked by means of a felt-covered elastic presser 14 which gives to the paper the right tension and adherence to the driving rollers before shaping and possible trimming. Then, the paper strip is pushed under a guide roller 15 and, with the aid of a shaped guide 16, it is inserted between the two shaping rollers—the top one 17 being movable and the bottom one 18 being stationary. During this stage, rollers 17 and 18 are temporarily separated, because the pressure is relieved from cylinder 19 which normally transmits its load to the movable roller 17 by means of an equalizer 20, pivotally mounted at 21.

After the rollers 17 and 18, the strip of insulating paper is pulled inside guides 22 toward the cutting area.

Figure 1:
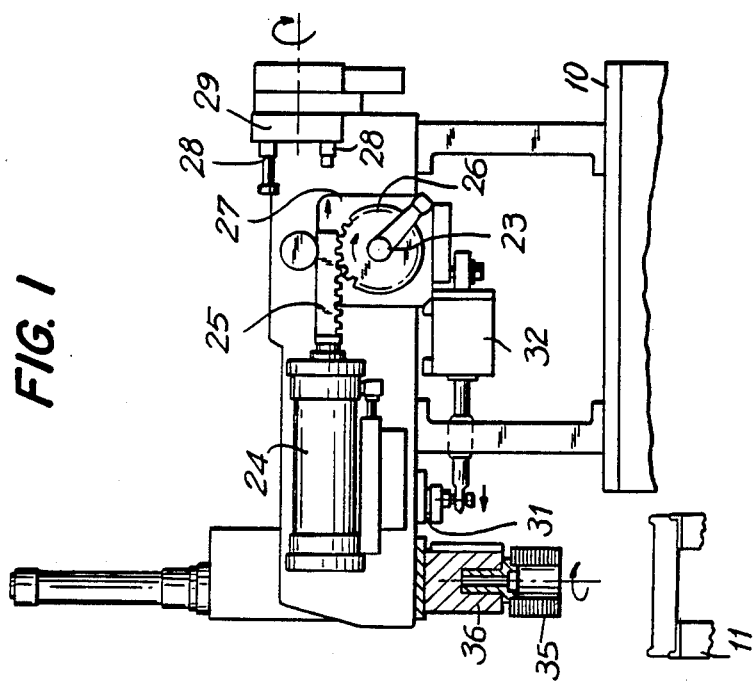

The above-described initial paper insertion is carried out manually by means of handle 23 (FIG. 1) which is fitted to a power supply motor axis.

The rollers 17 and 18, pushed one against the other by operation of cylinder 19, emboss or incise the insulating material and pull it forward.

When the machine is started, cylinder 24 extends, and by means of a mechanism consisting of rack 25, gear wheel 26, and electromagnetic clutch 27, connects gear wheel 26 to driving and shaping rollers 17 and 18. The stroke of the rack stem 25 of cylinder 24 can be chocked by means of a set of stops 28 all fitted to revolving head 29, and turned into position either manually or automatically. The operative stop 28 is changed by rotating head 29, thereby adjusting the length of the insulating material ultimately supplied to the stator slot. The machine may also be fed with wider insulating paper than required by the stator slot dimensions, because rollers 30 are provided for trimming the paper strip to the required width.

Rollers 17 and 18 emboss or incise the paper and push it into guide 22 which includes a curve for forcing the paper into a vertical alignment until it reaches cutting knife 31 which is disposed horizontally and driven by cylinder 32. The cut paper falls into guide 33 and then is formed into the proper shape for insertion in the stator 35 by means of the unidirectional shaping unit 34 which will be described further on. In the meantime, a stator 35 to be insulated is lifted from the paper insertion area, and centered by an appropriate fixture 36.

At this point the shaped insulating paper is inserted into the stator slot by needle-type pusher 37. At the end of this operation, the stator makes a 180° rotation and the operation is repeated.

Figure 5:
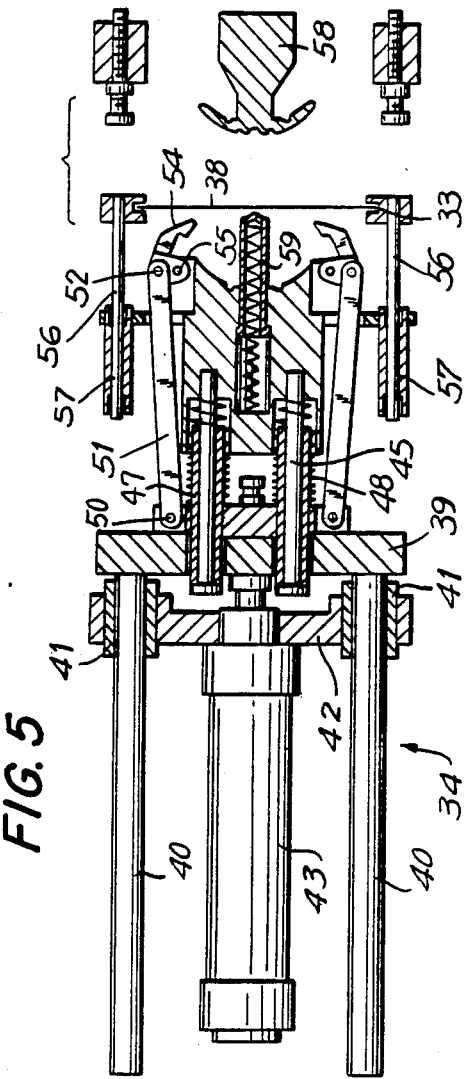

Shaping unit 34 is shown in more detail in FIGS. 5, 6, and 7. It comprises a plate 39 equipped with sliding rods 40 disposed in bushings 41 of a stationary frame 42. An actuator cylinder 43 is integral with frame 42, and the stem 44 of the actuator is integral with plate 39.

Plate 39 is equipped with pins 45 connecting it to body 46. Pins 45 are disposed in bushings 47 which are externally equipped with springs 48 that end in recesses 49 in body 46 where pins 45 are inserted. This assures smooth elastic coupling between body 46 and plate 39.

Arms 51 are hinged at 50 to plate 39, and the arms are also hinged at 52 to small plates 53 equipped with forming means 54. Plates 53 are hinged at 55 to body 46.

The already cut insulating material 38 is now inside guides 33. Sliding rods 56 run inside guides 57 which are integral with body 46. When forming unit 34 is advanced by cylinder 43, insulating material 38 initially touches the top of male former 58 as shown in FIG. 6. Then, as forming unit 34 continues to advance, the insulating material is held in the center by elastic central snug 59, projecting from body 46, and giving the paper the configuration 60 (dashed line in FIG. 6) with the help of the forming means 54 hinged at 52 and 53 and still open. In response to further advancement of unit 34 (FIG. 7), forming means 54 rotate in order to give the insulating material the final shape, pushing it over former 58.

Figure 4:
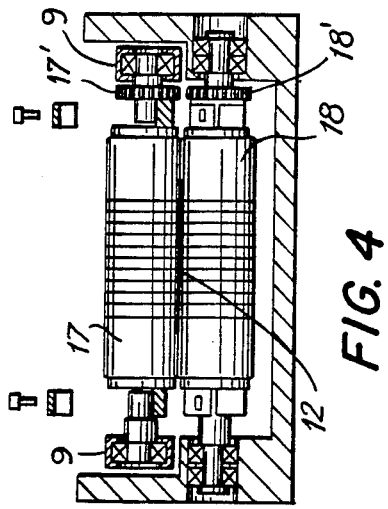
FIG. 4 is a sectional view taken along the line IV—IV in FIG. 3.
Figure 3:
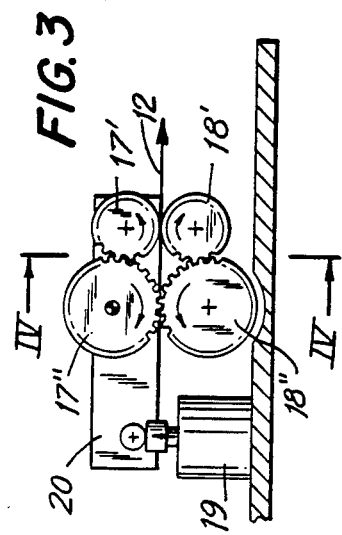
FIG. 3 is an enlarged view of a detail of FIG. 2.

The lower stationary roller 18 and the higher, movable roller 17 ensure both paper feed and embossing. They operate as follows:

Gear wheel 18" (FIGS. 3 and 4) is integral with wheel 26. Accordingly, gear wheel 18" is rotated by the mechanism comprising cylinder 24, rack 25, gear wheel 26, and the electromagnetic clutch previously described.

Gear wheel 18" rotates gear 18' and roller 18 with which gear 18' is integral. In addition, gear wheel 18" rotates gear 17", gear 17', and movable roller 17. Gear 17" is rotatable about axis 21, which is the pivotal axis of equalizer 20. Thus this gear system assures constant precision, independent of the thickness of the insulating material used. Indeed, the mesh among the gear wheels 17', 17", 18', and 18" is always ensured, even if the inclination of equalizer 20 or the contact pressure between rollers 17 and 18 is varied.

The pressure required for the embossing is kept constant over the entire width of the insulating material by the action of cylinder 19 which forces roller 17 downwards by means of equalizer 20 which, as has been mentioned, pivots on the same axis as gear 17", and also due to the fact that the roller is assembled on self-aligning bearings 9.

We claim:

1. Apparatus for shaping a sheet of insulating material into a shape having a modified C-shaped cross section, the modification of the C-shape being such that the free end portions of the C-shape are inclined toward the back of the C-shape in the direction toward each free end, said apparatus comprising:
    a form member having an exterior surface having said modified C-shape;
    means for pushing a central portion of said sheet against a first portion of said exterior surface which corresponds to the back of said modified C-shape, said sheet having a marginal portion on each side of said central portion which does not contact said first portion;
    means for causing each of said marginal portions to extend beyond said exterior surface in the direction from said first portion toward second portions of said exterior surface which correspond to said free end portions of said modified C-shape; and
    means extending from said means for pushing for folding each of said marginal portions in against a respective one of said second portions.

2. The apparatus defined in claim 1 wherein said sheet is initially substantially planar, and wherein said apparatus further comprises:
    means for initially holding said sheet by the free edges of said marginal portions.

3. The apparatus defined in claim 1 wherein said means for pushing comprises:
    a forming surface having a shape which is substantially the complement of said first portion;
    a pinning member resiliently projecting from a central portion of said forming surface toward said form member, the free end of said pinning member initially extending beyond said forming surface in the direction of said form member; and
    means for moving said forming surface toward said form member so that the free end of said pinning member initially contacts said sheet and pins it to said form member, after which said forming member conforms said central portion to said first portion.

4. The apparatus defined in claim 1 wherein said means for causing comprises:
    first and second arms mounted on said means for pushing so that a terminal portion of each arm is adjacent a respective one of said marginal portions, said terminal portions extending beyond said means for pushing in the direction of said form member; and
    means for moving said means for pushing toward said form member so that said terminal portions deflect said marginal portions beyond said exterior surface when said means for pushing pushes said central portion against said first portion.

5. The apparatus defined in claim 4 wherein said means for folding comprises:
    means for pivoting said terminal portion of each of said arms in against a respective one of said second portions after said means for pushing has pushed said central portion against said first portion.

6. The apparatus defined in claim 5 wherein each of said terminal portions is pivotally connected to said means for pushing; wherein said means for pushing is resiliently connected to said means for moving so that said means for pushing moves in response to said means for moving until said means for pushing has pushed said central portion against said first portion, after which said means for moving moves relative to said means for pushing; and wherein said means for pivoting operates in response to relative motion between said means for pushing and said means for moving.

7. The apparatus defined in claim 6 wherein said means for pivoting comprises:
    first and second members, each of which is pivotally connected at a first location to said means for moving, and each of which is pivotally connected at a second location, which is spaced from the first location, to the terminal portion on a respective one of said first and second arms, the pivotal connection between each of said members and the associated terminal portion being spaced from the pivotal connection between that terminal portion and said means for pushing.

8. The method of shaping a sheet of insulating material into a shape having a modified C-shaped cross section, the modification of the C-shape being such that the free end portions of the C-shape are inclined toward the back of the C-shape in the direction toward each free end, said method comprising the steps of:

provide a form member having an exterior surface having said modified C-shape;

pushing a central portion of said sheet against a first portion of said exterior surface which corresponds to the back of said modified C-shape, said sheet having a marginal portion on each side of said central portion which does not contact said first portion;

deflecting each of said marginal portions so that it extends beyond said exterior surface in the direction from said first portion toward second portions of said exterior surface which correspond to said free end portions of said modified C-shape; and folding each of said marginal portions in against a respective one of said second portions by reaching around from the side of said form member having said first portion of said exterior shape.

9. The method defined in claim 8 wherein said sheet is initially substantially planar, and wherein said method further comprises the step of:

initially holding said sheet by the free edges of said marginal portions.

10. The method defined in claim 8 wherein said step of pushing a central portion of said sheet against a first portion of said exterior surface includes the preliminary step of:

resiliently pinning said sheet to a central portion of said first portion.

11. The method defined in claim 8 wherein said step of deflecting each of said marginal portions is performed by the terminal portions of first and second arms extending from a location adjacent the side of said sheet which faces away from said form member, and wherein said step of folding each of said marginal portions comprises the step of:

pivoting each of said terminal portions in toward a respective one of said second portions.

12. Apparatus for shaping a sheet of insulating material into a shape having a modified C-shaped cross section, the modification of the C-shape being such that the free end portions of the C-shape are inclined toward the back of the C-shape in the direction toward each free end, said apparatus comprising:

a first form member having an exterior surface having said modified C-shape, a first portion of said exterior surface corresponding to the back of said modified C-shape, and second portions of said exterior surface corresponding respectively to the free end portions of the C-shape;

a second form member having a forming surface which is the complement of said first portion;

means for positioning said sheet between said first and second form members;

means for moving said first and second form members relative to one another so that a central portion of said sheet is pressed against said first portion by said forming surface, said sheet having a marginal portion on each side of said central portion which is not engaged by said first portion or said forming surface;

first and second arms mounted on said second form member so that a terminal portion of each arm is adjacent a respective one of said marginal portions, said terminal portions extending beyond said forming surface in the direction of said first form member so that as said first and second form members are moved relative to one another, said terminal portions extend beyond said second portions in the direction from said first portion to said second portions and cause said marginal portions to similarly extend beyond said second portions; and means for causing each of said terminal portions to pivot toward the adjacent second portion after it has extended beyond said second portion in order to fold the associated marginal portion in against said second portion.

13. The apparatus defined in claim 12 wherein said sheet is initially substantially planar, and wherein said apparatus further comprises:

means for initially holding said sheet by the free edges of said marginal portions.

14. The apparatus defined in claim 12 further comprising:

a primary member resiliently projecting from a central portion of said forming surface toward said form member, the free end of said pinning member initially extending beyond said forming surface in the direction of said first portion so that, as said means for moving moves said first and second form members relative to one another, the free end of said pinning member initially contacts said sheet and pins it to said first portion.

15. The apparatus defined in claim 12 further comprising:

means for resiliently connecting said means for moving to said second form member so that said means for pushing moves in response to said means for moving until said means for pushing has pushed said central portion against said first portion, after which said means for moving moves relative to said means for pushing.

16. The apparatus defined in claim 15 wherein said means for causing is responsive to relative motion between said means for pushing and said means for moving.

* * * * *